United States Patent Office 3,388,148
Patented June 11, 1968

3,388,148
N-CYANOETHYL DERIVATIVES OF NITRO-p-PHENYLENEDIAMINE
Moses D. Altman, Morristown, N.J., assignor to Warner-Lambert Pharmaceutical Company, Morris Plains, N.J., a corporation of Delaware
No Drawing. Filed June 16, 1965, Ser. No. 464,544
5 Claims. (Cl. 260—465)

ABSTRACT OF THE DISCLOSURE

N-substituted derivatives of nitro-p-phenylenediamine of the formula:

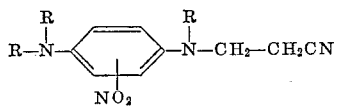

wherein R may be hydrogen or

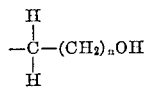

in which $n$ is an integer of from 1 to 5. These compounds are useful as dyes for fabric, hair and the like.

---

This invention relates to N-substituted derivatives of nitro-p-phenylenediamine and relates more particularly to N-cyanoethyl-substituted derivatives of nitro-p-phenylenediamine of the formula:

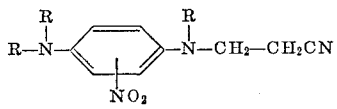

wherein R may be hydrogen or

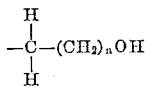

in which $n$ is an integer of from 1 to 5.

This invention also encompasses within its scope a novel process for the production of the above compounds as well intermediates useful for the production of these compounds.

The compounds of this invention exhibit significant colorations such as red, violet and blue and therefore useful in various dyeing processes such as fabric or hair dyeing. These dyes, for example, may be incorporated into compositions such as those described in U.S. Patent Nos. 2,763,269, 3,098,013, 3,092,555 and British Patent No. 955,743 or they may be combined with other dyes such as nitro dyes, mono azo dyes, anthraquinone dyes, naphthoquinone dyes azomethine dyes and other dyes well known to the art to obtain the desired shade. Furthermore, because these compounds have very little tendency to stain skin they are superior and advantageous over previously known hair dyes.

According to the process of this invention, the above compounds are prepared by treating cyanoethyl derivatives of the formula:

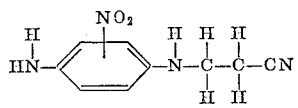

with an alkylene halo hydrin such as ethylene chlorohydrin in the presence of an acid binding agent such as soda ash, sodium bicarbonate or sodium acetate in approximately equal parts by weight at a temperature of from 100–130° C. for an extended period such as 24 hours. At the completion of the reaction period, the mixture is treated with water and charcoal to remove impurities and the resulting mixture is filtered. The filtrate is then extracted several times with a suitable solvent such as ethyl acetate and the desired reaction product is recovered by removal of the solvent by techniques such as evaporation or evaporation in vacuo.

The starting material, that is the cyanoethyl derivatives of 2-nitro-p-phenylenediamine are prepared by treating nitro-p-phenylenediamine with acrylonitrile in the presence of catalysts such as cupric acetate or trimethylbenzyl ammonium hydroxide in a solvent such as dioxane, at a temperature from 80 to 90° C. for 24 hours. The material is then recovered from the reaction solvent by precipitation techniques.

In order to illustrate this invention further, the following examples are given:

EXAMPLE 1

N-(2-cyanoethyl)-2-nitro-p-phenylenediamine

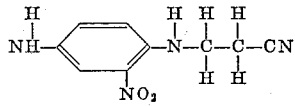

Twenty parts acrylonitrile is slowly added to a solution containing 100 parts by weight of dioxane, 15.3 parts nitro-p-phenylenediamine, 10 parts of a 40% solution of trimethylbenzyl ammonium hydroxide in methanol and the resulting mixture is allowed to be maintained at a temperature at 45° C. for about 3 hours. After this the mixture is filtered and the filtrate is drowned into 100 parts by weight of water. The desired cyanoethyl derivative of 2-nitro-p-phenylenediamine is recovered in the form of a precipitate. This material after recrystallization from hot water melts at 142 to 144° C.

Analysis for $C_9H_{10}N_4O_2$.—Calc'd: C, 52.42; H, 4.89; N, 27.17. Found: C, 52.38; H, 5.04; N, 26.87.

EXAMPLE 2

N-(2-cyanoethyl)-3-nitro-p-phenylenediamine

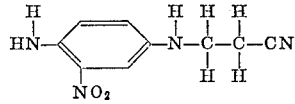

300 parts by weight of dioxane, 306 parts by weight of nitro-p-phenylenediamine, 11 parts by weight of acrylonitrile, 2 parts by weight of cupric acetate and 0.5 part by weight of hydroquinone are refluxed together for 24 hours at a temperature of about 80 to 90° C. After cooling the mixture is drowned into 4000 parts by weight of water. The precipitated product is then filtered and dried to yield the cyanoethyl derivative of 3-nitro-p-phenylenediamine. This material after recrystallization from hot water has a M.P. of 123 to 124° C.

Analysis for $C_9H_{10}N_4O_2$.—Calc'd: C, 52.42; H, 4.89; N, 27.17. Found: C, 52.60; H, 4.91; N, 26.91.

EXAMPLE 3

N-(2-cyanoethyl)-N'-(2-hydroxyethyl)-2-nitro-p-phenylenediamine

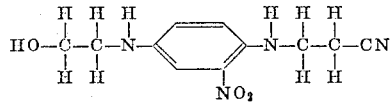

Five parts by weight of N-(2-cyanoethyl)-2-nitro-p-phenylenediamine (obtained in accordance with Example 2), 5 parts soda ash and 15 parts of ethylene chlorohydrin are heated together for 24 hours at 130° C. in a sealed tube. The mixture is added to 400 cc. water at 95° C., made slightly alkaline, treated with charcoal and filtered. The filtrate obtained is extracted several times with ethyl acetate. The desired reaction product ethylol substituted cyanoethyl-nitro-p-phenylenediamine is obtained in the form of an oil after removal of the solvent. This product can be incorporated into a dyeing composition; for example, 1 gram of the above compound is dispersed in a hair color composition comprising the following ingredients:

| | Percent |
|---|---|
| Sodium lauryl sulfate | 1.0 |
| Benzyl alcohol | 5.0 |
| Ethyl alcohol | 10.0 |
| Distilled water | To make 100.0 |

The resulting solution is then applied to white hair for 30 minutes followed by rinsing with warm tap water. The hair assumes a reddish blue color which does not stain the skin.

EXAMPLE 4

N-(2-cyanoethyl)-N'-(2-hydroxyethyl)-3-nitro-p-phenylenediamine

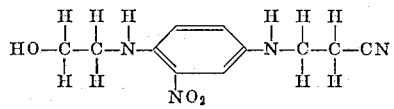

In an analogous fashion (as described in Example 3) 5 parts of N-(2-cyanoethyl)-3-nitro-p-phenylenediamine is treated with soda ash and ethylene chlorohydrin to yield N-(2-cyanoethyl) - N'-(2-hydroxyethyl)-3-nitro-p-phenylenediamine.

It is understood that the foregoing detailed description is given merely by way of illustration and that many variations may be made therein without departing from the spirit of my invention.

Having described my invention, what I desire to secure by Letters Patent is:

1. A compound of the formula:

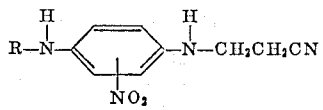

wherein R is a member of the group consisting of hydrogen or

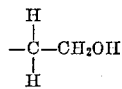

2. A compound of the formula:

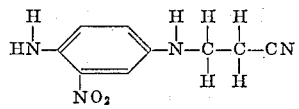

3. A compound of the formula:

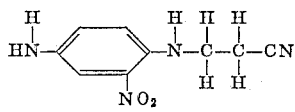

4. A compound of the formula:

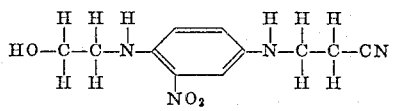

5. A compound of the formula:

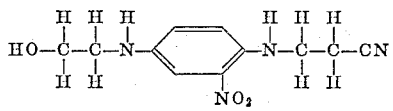

References Cited

UNITED STATES PATENTS

| 2,750,326 | 6/1956 | Eckardt et al. | 260—573 X |
| 2,750,327 | 6/1956 | Eckardt et al. | 260—573 X |
| 2,820,051 | 1/1958 | Buc | 260—465 |
| 3,231,601 | 1/1966 | Peterli | 260—465 |

OTHER REFERENCES

The Chemistry of Acrylonitrile, pp. 22, 23, 181, and 183.
Organic Reactions, Wiley, vol. 5, pp. 80–87.

CHARLES B. PARKER, *Primary Examiner.*

S. T. LAWRENCE, III, *Assistant Examiner.*